C. E. PETERSON.
RAZOR STROP SWIVEL.
APPLICATION FILED FEB. 11, 1918.
1,274,587.
Patented Aug. 6, 1918.
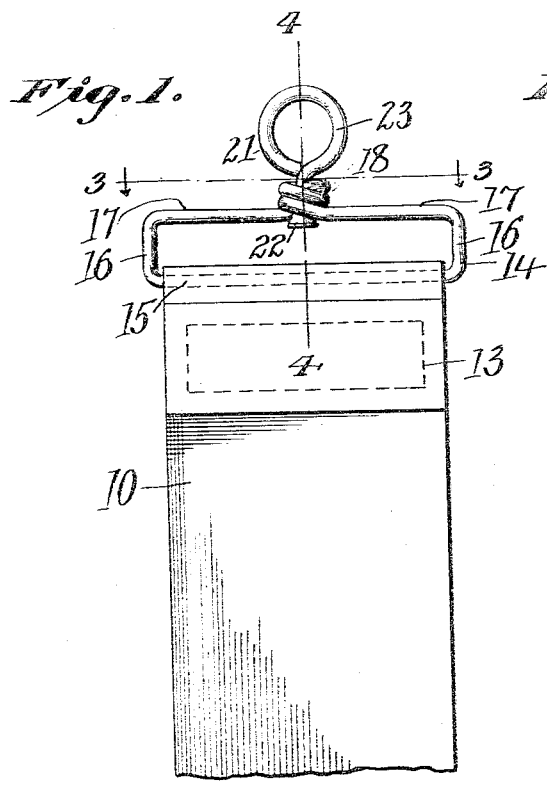
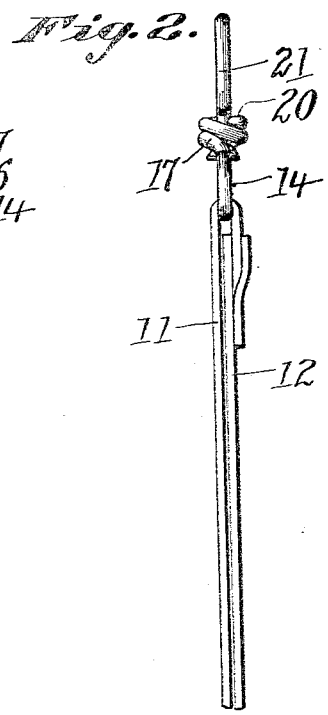
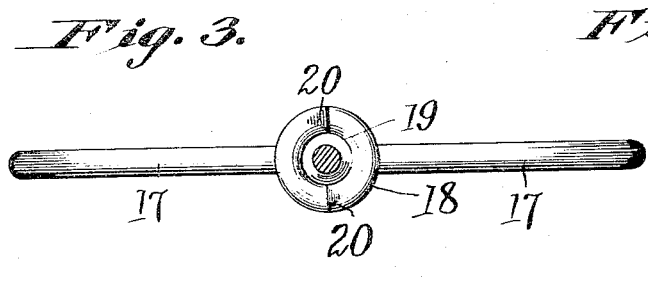
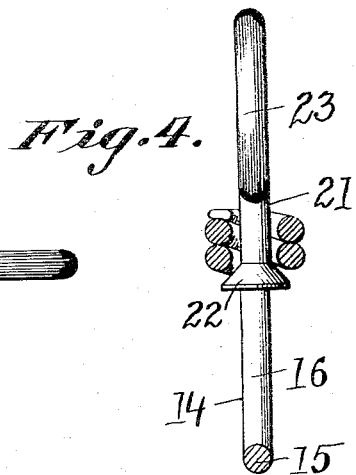
Inventor
Carl E Peterson
By
Dyke & Camfield
Attorneys

UNITED STATES PATENT OFFICE.

CARL E. PETERSON, OF IRVINGTON, NEW JERSEY.

RAZOR-STROP SWIVEL.

1,274,587.

Specification of Letters Patent.  Patented Aug. 6, 1918.

Application filed February 11, 1918.  Serial No. 216,470.

*To all whom it may concern:*

Be it known that I, CARL E. PETERSON, a citizen of the United States, and a resident of Irvington, county of Essex, and State of New Jersey, have invented certain new and useful Improvements in Razor-Strop Swivels, of which the following is a specification.

This invention relates to razor strop swivels formed of wire. The object of the invention is to produce a simple, cheap device of the character referred to, which is light and strong and may be inexpensively and readily constructed.

In the accompanying drawing, forming a part of this specification and wherein the same reference numerals are applied uniformly to designate the same parts throughout, Figure 1 is a plan view of a portion of a razor strop having my improved swivel attached thereto. Fig. 2 is a side view of the strop and swivel shown in Fig. 1. Fig. 3 is a sectional view of the swivel taken on the line 3—3, Fig. 1, and Fig. 4 is a longitudinal sectional view on the line 4—4, Fig. 1.

Reference numeral 10 designates the razor strop, which may be of any form. The strop shown has substantially the form of an endless belt comprising two parts 11 and 12, which may be secured together as by means of stitching 13. The swivel comprises a loop member adapted to be attached to the strop, and a holding or suspending member adapted to be placed on a nail, hook or the like and swiveled to the loop member. The loop member 14 of the swivel is formed of wire, as stated, and comprises a cross bar 15 adapted to be inserted in or attached to the strop and side pieces 16, 16 and converging portions 17, 17. The portions 17, 17 in the form shown extend inwardly toward one another substantially parallel to the bar portion 14, but there may be variations in this respect, as will be obvious. The portions 17, 17 are sufficiently long to extend past one another and are twisted together at and near their ends so as to make up a spirally formed substantially tubular member 18 having a central opening 19 therein. The ends of the parts 17, 17 are preferably beveled off, as shown at 20, and terminate substantially opposite one another so as to form a substantially flat upper or outer surface for the twisted tubular member 18 which does not interfere with rotation of the swivel member 21. The swivel member 21 is inserted within the opening 19 and is also preferably formed of wire, preferably having a head 22 sufficiently large to prevent its passage through the opening 19, and the member 21 is provided with means for securing the device to a nail or other support, and in the form shown it is formed into a closed loop 23 for this purpose.

The advantages of the improved swivel will clearly appear from the foregoing. It is customary, in making razor strop swivels of wire, to form a flat in the wire with a hole in it for the insertion of the swivel member and to bring the separated ends of the wire together within the loop or fold of the strop. Such construction is inherently weak, and in order that it may be used at all it is necessary to form the loop for the strop out of unduly heavy wire or rod. In the present construction the wire is continuous throughout the entire extent of the loop member and the ends are twisted together to form the swivel bearing in a manner which greatly strengthens and reinforces the loop, and much lighter wire can be used than in the ordinary construction, and at the same time a stronger and more efficient swivel member may be obtained.

I claim:

1. A swivel device for razor strops including a loop for receiving the strop and made up of a continuous piece of wire, the end portions of which are twisted together spirally, thereby forming a hollow coil, and a swivel member rotatably received in said hollow coil and having a head on its inner end and means for engaging a support on its outer end.

2. A swivel device for razor strops including a loop formed of a continuous piece of wire with its ends twisted together leaving a central aperture within the twisted portion, the ends of the wire being beveled, whereby the end of the twisted bearing portion is substantially plane, and a swivel member rotatably received in said aperture and having a head on its inner end and a closed loop on its outer end.

In testimony that I claim the foregoing, I have hereto set my hand, this 7th day of February, 1918.

CARL E. PETERSON.